United States Patent
Giacalone et al.

(10) Patent No.: US 6,385,598 B1
(45) Date of Patent: *May 7, 2002

(54) FUZZY PROCESSOR WITH ARCHITECTURE FOR NON-FUZZY PROCESSING

(75) Inventors: Biagio Giacalone, Trapani; Francesco Pappalardo, Paterno'; Enrico Pelos, Palermo; Vincenzo Catania, S. Agata Li Battiati, all of (IT)

(73) Assignee: Consorzio per la Ricerca Sulla Microeleti Nel Mezzogiorno, Catania (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/623,617

(22) Filed: Mar. 29, 1996

(30) Foreign Application Priority Data

Mar. 30, 1995 (EP) .............................. 95830117

(51) Int. Cl.[7] .......................... G06F 15/18; G06F 17/00
(52) U.S. Cl. .................. 706/1; 706/4; 706/5; 706/45; 706/46; 706/50; 706/52
(58) Field of Search ........................... 706/1, 7, 46, 52, 706/3, 4, 5, 45, 50

(56) References Cited

U.S. PATENT DOCUMENTS

| | | | | |
|---|---|---|---|---|
| 5,261,036 A | * | 11/1993 | Nakano | 706/52 |
| 5,263,125 A | * | 11/1993 | Viot | 706/52 |
| 5,285,376 A | * | 2/1994 | Struger | 706/60 |
| 5,305,424 A | * | 4/1994 | Ma et al. | 706/52 |
| 5,430,828 A | * | 7/1995 | Yamamoto | 706/46 |
| 5,524,174 A | * | 6/1996 | Eichfeld et al. | 706/4 |
| 5,600,757 A | * | 2/1997 | Yamamoto et al. | 706/1 |
| 5,790,755 A | * | 8/1998 | Pagni et al. | 706/4 |

OTHER PUBLICATIONS

H. Watanabe et al., "VLSI Fuzzy Chip and Inference Accelerator Board Systems," Proceedings of the 21st International Symposium on Multiple–Valued Logic, May 1991, pp. 120–127.*
H. P. Eichfeld et al., "An 8 B Fuzzy Coprocessor for Fuzzy Control," Feb. 1993 IEEE International Solid–State Circuits Conference, pp. 180–181, 286.*
Partial European Search Report from European Patent Application 95830117.8, filed Mar. 30, 1995.
IEEE Micro, vol. 13, No. 5, Oct. 1993, pp 37–48, Kazuo Nakamura, et al., "Fuzzy Interference and Fuzzy Interference Processor".
Elektronik, vol. 41, No. 17, Aug. 18, 1992, pp 40–46, Rossman, J. "Der Realismus Kehrt Ein".
Technische Rundschau, vol. 85, No. 48, Dec. 3, 1993, Bern CH, pp 30–32, J. Zhang, et al., "Mit Fuzzy: Hohe Regelgeschwindigkeit".

* cited by examiner

Primary Examiner—George B. Davis
(74) Attorney, Agent, or Firm—Wolf, Greenfield & Sacks, P.C.; James H. Morris

(57) ABSTRACT

A fuzzy processor with an improved architecture. The fuzzy processor includes a fuzzy rule processor, an internal fuzzy instruction memory, an internal knowledge base memory, an arithmetic-logic unit, a control unit that can execute non-fuzzy instructions that are typical of conventional microprocessors, and an internal memory for storing the non-fuzzy instructions. The improved fuzzy processor architecture has an ability to load other knowledge bases and other fuzzy rules from outside the processor concurrently and transparently with respect to instruction processing. The processor can also process both fuzzy instructions and non-fuzzy instructions, can perform conditional and unconditional jumps within a set of fuzzy rules that are being processed, and can conditionally swap the knowledge base or the set of rules that are to be processed.

15 Claims, 1 Drawing Sheet

FUZZY PROCESSOR WITH ARCHITECTURE FOR NON-FUZZY PROCESSING

BACKGROUND OF THE INVENTION

1. Field of the Invention

The present invention relates to fuzzy processors, and more particularly to a fuzzy processor which can also perform non-fuzzy processes.

2. Discussion of the Related Art

It is known that there are various kinds of fuzzy processors. An example of a classic fuzzy processor is the MB94110 processor by Fujitsu, comprising a block that performs fuzzy instructions. Another example is the SAE81 C99 processor by Siemens, which can also load various knowledge bases from an external memory, although this is not possible conditionally or concurrently with normal fuzzy processing.

Accordingly, known fuzzy processors only process fuzzy instructions and cannot integrate fuzzy control with the processing of classic instructions such as shift, rotate, compare, or arithmetic/logic instructions, and also have no signals such as interrupt, stack, etcetera. Accordingly, it is not possible to perform any kind of arithmetic/logic processing on the inputs and on the outputs of the fuzzy controller.

All known fuzzy control units furthermore perform control by processing the fuzzy instructions sequentially, with no possibility of jumping from one instruction to another.

Another characteristic of known fuzzy processors is that they process a fixed number of inputs and a fixed number of fuzzy rules. A certain number of membership functions are associated with each fuzzy input, and the set of these functions is termed a knowledge base. Both the set of fuzzy rules and the knowledge base remain unchanged throughout processing.

SUMMARY OF THE INVENTION

Accordingly, an aim of the present invention is to provide a fuzzy processor with an improved architecture that is more versatile than known fuzzy processors.

Within the scope of the above aim, an object of the present invention is to provide a fuzzy processor with an improved architecture that is capable of handling inputs and outputs.

Another object of the present invention is to provide a fuzzy processor with improved architecture that is capable of loading various knowledge bases or sets of fuzzy rules from outside during normal operation.

Another object of the present invention is to provide a fuzzy processor with an improved architecture capable of changing the knowledge base or the set of fuzzy rules to be processed during normal processing, conditionally or unconditionally, the conditions occurring on the inputs or on the outputs.

Another object of the present invention is to provide a fuzzy processor with an improved architecture capable of performing arithmetic/logic processing on the inputs and on the outputs of the fuzzy controller, processing non-fuzzy instructions, and handling interrupt signals.

Another object of the present invention is to provide a fuzzy processor with an improved architecture capable of performing conditional or unconditional jumps within fuzzy instructions.

Another object of the present invention is to provide a processor that is highly reliable and relatively easy to manufacture at a competitive cost.

This aim, these objects, and others which will become apparent hereinafter are achieved by a fuzzy processor with an improved architecture, comprising: a fuzzy rule processor, an internal fuzzy instruction memory, and an internal knowledge base memory, and characterized in that it also includes an arithmetic-logic unit, a control unit capable of performing non-fuzzy instructions typical of conventional microprocessors, and an internal memory comprising non-fuzzy instructions.

BRIEF DESCRIPTION OF THE DRAWINGS

The characteristics and advantages of the invention are apparent from a description of a preferred but not exclusive embodiment thereof, illustrated by way of non-limitative example in the accompanying drawings, in which.

DETAILED DESCRIPTION

Figure 1:
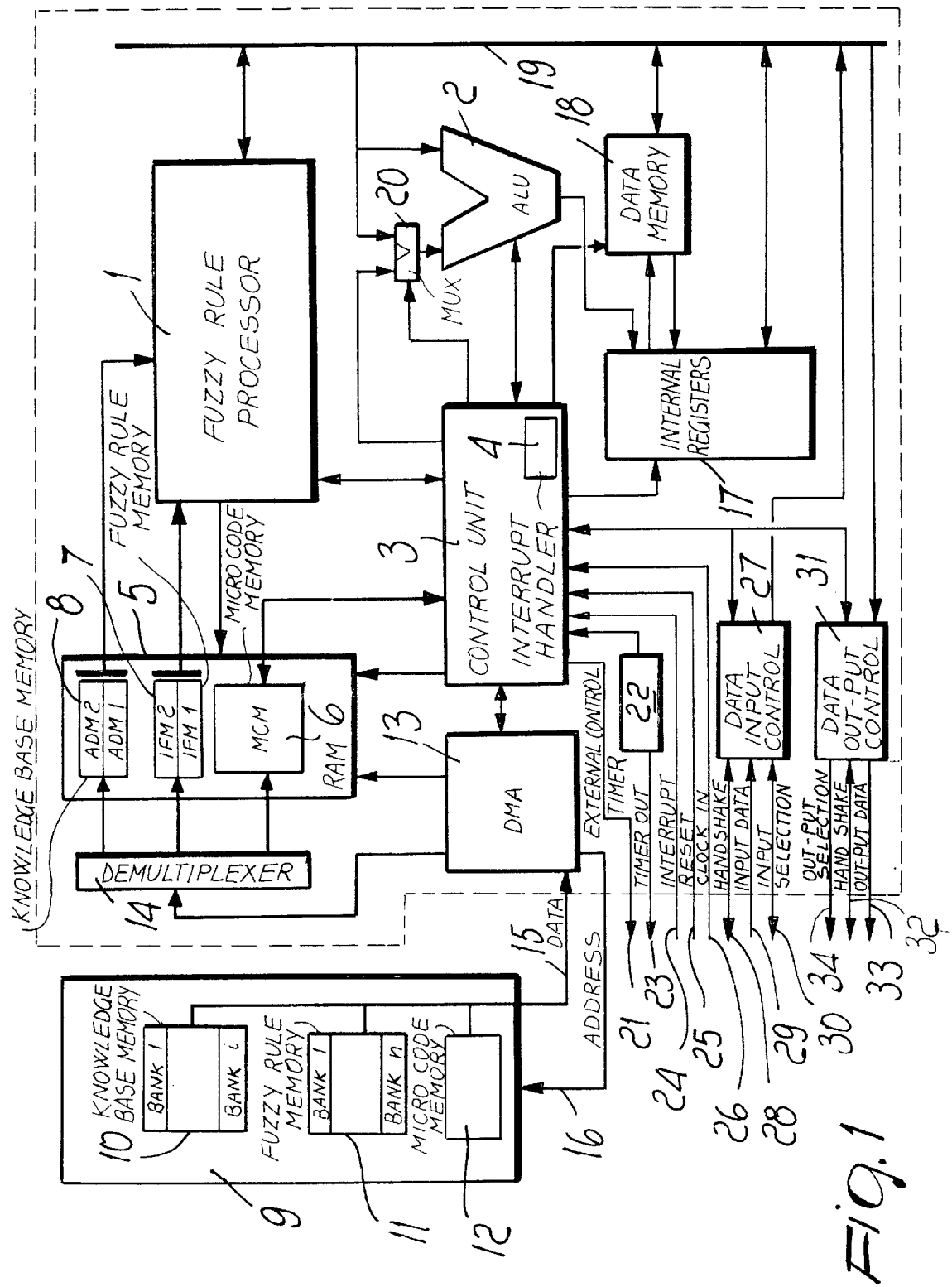
FIG. 1 is a block diagram of a fuzzy processor with an improved architecture according to the present invention.

Known fuzzy processors only process fuzzy instructions and cannot integrate fuzzy control with the processing of classic instructions such as shift, rotate, compare, and arithmetic-logic instructions, and also have no signals such as interrupt, stack, etcetera. The fuzzy processor according to the present invention is provided with an arithmetic/logic unit (ALU), a direct memory access control unit (DMA), a timer, an interrupt handler, interfaces for the buses, and other components. The fuzzy instructions are integrated with non-fuzzy instructions, such as arithmetic/logic instructions, shift, rotate, etcetera, according to a definable hierarchy. That is to say, all the instructions also allow non-fuzzy processing of input and/or output data.

Furthermore, the fuzzy control unit according to the present invention can use internal registers of the chip as inputs of the fuzzy section and can also use them as buffer registers for the output of the fuzzy section, and preprocessings on the inputs and postprocessings on the outputs can be performed in these registers.

It is stressed that although adders, subtracters, multipliers, and dividers are already present in the classic architecture of a fuzzy control unit and are used for fuzzification and defuzzification, the present invention proposes the concept of arithmetic/logic processing of the inputs and of the outputs, the execution of non-fuzzy instructions, and the handling of interrupt signals. These functions can be performed by using appropriately modified existing blocks or specifically designed circuitry. In particular, input and output processing can be performed almost entirely by existing blocks.

In this manner it is possible to integrate fuzzy control with non-fuzzy instructions that accordingly allow one to flexibly handle the system to be controlled, and it is furthermore possible to control more complex systems. It is possible to preprocess the inputs of the fuzzy section with arithmetic/logic operations, so as to create new inputs of the fuzzy section as incremental ratios of the input, remove or add an offset, perform digital filterings on the inputs, etcetera. It is also possible to postprocess the outputs of the fuzzy section to adapt them to the outside world, for example by removing or adding an offset, clipping below a maximum value, etcetera. By means of the interrupt signals it is possible, if required, to interrupt control to perform emergency, control, or system management operations by means of non-fuzzy instructions.

As mentioned, another problem of known fuzzy control units is that they perform control by processing the fuzzy instructions sequentially, without being able to jump from one fuzzy instruction to another. The fuzzy processor according to an illustrative embodiment of the present invention proposes the insertion, among fuzzy rules, of conditional or unconditional jump instructions, in which the optional condition will have to occur on the inputs or on the outputs. This allows one to instantly adapt the fuzzy control to particular changes in the system to be controlled, and therefore to jump within the rules to be processed according to the inputs or outputs obtained.

As mentioned above, all known fuzzy control units process a fixed number of inputs and fuzzy rules. A certain number of membership functions are associated with each input. The set of membership functions is termed a knowledge base. Both the set of rules and the knowledge base are invariant throughout processing.

In contrast, the processor according to the present invention is able to change the knowledge base and/or the set of fuzzy rules during normal processing. This is performed by means of a buffer memory, where the next knowledge base and/or set of fuzzy rules to be processed is loaded during normal operation, so that the base or set can be swapped by virtue of an instruction for conditional or unconditional swapping of the rule set and/or the knowledge base. The conditions can be imposed on the inputs or on the outputs. This allows adaptive control and furthermore, by associating different inputs with the various knowledge bases, it is possible to process a larger number of inputs and thus to perform more simply the time-sharing control of a plurality of systems. Indeed, this allows one to process an infinite number of fuzzy rules.

To summarize, characteristics that are innovative with respect to known fuzzy processors are the possibility of loading from outside the fuzzy rule memory and the knowledge base memory (the membership functions) concurrently (and transparently) with respect to instruction processing; the possibility of processing both fuzzy rules and non-fuzzy instructions (shift, rotate, arithmetic/logic operations, etcetera); the possibility of conditional or unconditional jumps within the set of fuzzy rules that is being processed; and finally, the possibility of conditionally or unconditionally swapping the knowledge base or the set of rules to be processed.

A block diagram of the innovative architecture of the fuzzy processor according to an illustrative embodiment of the present invention is shown in FIG. 1.

The reference numeral 1 designates the classic fuzzy rule processor, which executes fuzzy rules. An arithmetic/logic unit (ALU) 2 has been included in the processor according to the present invention to perform the arithmetic/logic processing of the inputs and of the outputs.

A control unit 3 is furthermore connected to the ALU 2 and is adapted to perform non-fuzzy instructions. An interrupt handler 4 is located inside the control unit 3. The control unit 3 is furthermore connected directly to the fuzzy rule processor 1. The control unit 3 and the ALU 2 are connected to internal registers 17, which in turn are connected to a data memory 18 that acts as a buffer for the internal registers 17. The control unit 3 is also connected to the data memory 18. The internal registers 17, the data memory 18, the ALU 2, and the fuzzy rule processor 1 are connected to a data bus 19.

More specifically, the data bus 19 is connected to the ALU 2 by means of two lines, a direct line, and a line that passes through a multiplexer 20 which performs a selection so that the second input of the ALU 2 arrives from the data bus or from the control unit 3. An external control line IF/MC 21 is connected to the control unit 3 and sends a signal externally if the processor is executing fuzzy or non-fuzzy instructions. A conventional timer 22 is furthermore connected to the control unit 3 and has its own output line 23. Interrupt signals are sent to the control unit 3 and to the interrupt handler 4 located therein by means of an interrupt line 24. Reset signals are sent to the control unit by means of a reset line 25. A clock signal is sent to the control unit 3 by means of a clock line 26.

A data input control unit 27 is furthermore connected to the data bus 19 and to the control unit 3. The control unit 27 is connected to the outside by means of a handshake line 28, an input data line 29, and an input number selection line 30 for selecting an input among the multiple available inputs.

A data output control unit 31 is likewise connected to the data bus 19 and to the control unit 3. Said data output control unit is connected to the outside by means of a handshake line 32, an output data line 33, and an output number selection line 34 for externally indicating which among the plurality of available outputs is on the output data line 33.

The processor according to the present invention is furthermore provided with an internal RAM memory 5 directly connected to the fuzzy rule processor 1 and to the control unit 3. The RAM memory 5 furthermore internally comprises, in addition to other components, a microcode memory (MCM) 6. Said microcode memory 6 stores all the non-fuzzy instructions and is directly connected to the control unit 3, so that said instructions are executed by said control unit.

The internal RAM memory 5 furthermore includes a fuzzy instruction memory 7 (IFM) that is conveniently divided into two parts, IFM 1 and IFM2. Said fuzzy instruction memory 7 comprises all the fuzzy instructions that must be executed by the fuzzy rule processor 1 to which the memory 7 is directly connected.

The choice of having two separate memories for fuzzy instructions and non-fuzzy instructions is due to the different bit sizes of the two kinds of instructions.

The internal RAM memory 5 furthermore comprises a knowledge base memory 8 that is conveniently divided into two parts ADM1 and AMD2 (Antecedent Data Memory) and is directly connected to the fuzzy rule processor 1.

An external memory 9 is furthermore associated with the processor according to the present invention and can advantageously be an internal one; it comprises an external knowledge base memory 10, an external fuzzy rule memory 11, and an external microcode memory 12.

The external knowledge base memory 10 is divided into multiple banks, each of which contains a knowledge base, from bank 1 to bank i, and the external fuzzy rule memory 11 is also divided into multiple banks, each bank containing a different set of rules, from bank 1 to bank n.

The external memory 9, with its respective internal memories 10, 11, and 12, is connected to the internal RAM memory 5 by means of a direct memory access control unit (DMA) 13 and a demultiplexer 14. The memories 10, 11, and 12 are connected to the DMA 13 by means of a data line 15, and the DMA 13 is connected to the external memory by means of a memory address line 16. The DMA allows one to load knowledge bases and sets of fuzzy instructions in the corresponding buffer memories concurrently with normal processing.

The operation of the fuzzy processor according to an embodiment of the present invention is as follows.

The arithmetic/logic unit 2 performs the arithmetic/logic processing, whereas the non-fuzzy instructions are performed by the control unit 3. The non-fuzzy instructions reside in the microcode memory 6 and are performed directly by the control unit 3, whereas the fuzzy rules are stored in the fuzzy instruction memory 7, and the task of processing the fuzzy rules is assigned to the fuzzy rule processor 1.

The control unit 3 can order the execution of a certain number n of fuzzy instructions processed by the fuzzy processor 1 and then resume control.

Interrupts are requested by means of the interrupt line 24 and performed by the interrupt handler 4 located inside the control unit 3.

After resetting the processor, by means of a signal sent over the reset line 25, execution of the instructions starts from address 0 of the microcode memory 6 and continues to process the non-fuzzy instructions until it encounters an instruction that orders the execution of a number n of fuzzy rules from a given memory address IFM 5. The n fuzzy rules are executed by the fuzzy rule processor 1 by taking them from the fuzzy instruction memory 7; then the execution of non-fuzzy instructions resumes.

The non-fuzzy instructions also include the instruction ordering processing of the fuzzy instructions in a continuous cycle (as in classic fuzzy control units) and can be interrupted only by an intervening interrupt.

The fuzzy rules can process the inputs taken directly from the outside by means of the data input control unit 27 or the inputs residing in the internal registers 17, which in this case may have been preprocessed by the control unit 3. The outputs of the fuzzy rule processor 1 can furthermore be sent immediately outside by means of the data output control unit 31 or placed in the internal registers 17, so that they can be postprocessed by the control unit 3 before being sent outside the processor.

In order to perform conditional jumps inside fuzzy rules, a jump instruction has been inserted among the fuzzy instructions contained in the fuzzy instruction memory 7; alternatively, this can be done by means of the control unit.

The possibility of changing the knowledge base or the set of fuzzy rules to be processed during normal processing is provided by means of the DMA 13, which transparently loads from the external memory 9 the new knowledge base and/or the set of rules to be processed.

The internal knowledge base memory 8 and the internal fuzzy instruction memory 7 inside the internal RAM memory 5 are duplicated in memories ADM1–ADM2 and IFM1–IFM2 respectively, since while the fuzzy rule processor 1 processes rules residing in one of the fuzzy instruction memories IFM by using the knowledge base that resides in a knowledge base memory ADM, the DMA 13 can load the other memories (by taking the data from the external memory 9), and therefore the instruction for swapping the knowledge base or the set of fuzzy rules to be processed simply swaps the internal memories to be processed. This last instruction can be conditional or unconditional, and the conditions to be verified may occur on the inputs and on the outputs of the fuzzy rule processor 1 or also on the non-fuzzy processing value.

From the above description it is evident that the present invention fully achieves the intended aim and objects.

The invention thus conceived is susceptible to numerous modifications and variations, all of which are within the scope of the inventive concept. Finally, all the details may be replaced with other technically equivalent ones. In practice, the materials employed, as well as the shapes and dimensions, may be according to the requirements without thereby abandoning the scope of the protection of the appended claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A fuzzy processor comprising:
   a fuzzy rule processor;
   an internal fuzzy instruction memory coupled to the fuzzy rule processor;
   an internal knowledge base memory coupled to the fuzzy rule processor;
   a control unit coupled to the fuzzy rule processor that executes non-fuzzy instructions, wherein the control unit has direct memory access and transparently swaps data between the external knowledge base memory and the internal knowledge base memory, between the external fuzzy instruction memory and the internal fuzzy instruction memory, and between the external non-fuzzy instruction memory and the internal non-fuzzy memory;
   an arithmetic-logic unit coupled to the control unit;
   an internal non-fuzzy memory coupled to the control unit that stores the non-fuzzy instructions;
   an external memory having an external knowledge base memory, an external fuzzy instruction memory, and an external non-fuzzy instruction memory;
   an internal register coupled to the control unit and the arithmetic-logic unit, the internal register to store at least one of input data to the fuzzy rule processor and output data from the fuzzy rule processor;
   a data input unit coupled to the control unit to receive and provide input data to the fuzzy processor,
   a data output unit coupled to the control unit to receive and output data from the fuzzy processor; and
   a data bus connected to the control unit, the fuzzy rule processor, the arithmetic-logic unit, the data input unit the data output unit, and the internal register to transfer data.

2. The fuzzy processor of claim 1, wherein the internal knowledge base memory and the internal fuzzy instruction memory each have first and second parts.

3. The fuzzy processor of claim 1, further comprising a data memory coupled to the internal register.

4. The fuzzy processor of claim 1, wherein the internal fuzzy instruction memory includes at least one jump instruction, and wherein the fuzzy rule processor can execute the at least one jump instruction.

5. The fuzzy processor of claim 4, wherein the at least one jump instruction is a conditional jump instruction.

6. The fuzzy processor of claim 1, further comprising a clock coupled to the control unit.

7. The fuzzy processor of claim 1, wherein the fuzzy processor processes a plurality of inputs and fuzzy rules and performs time-sharing and adaptive control of a plurality of processes.

8. A fuzzy processor comprising:
   a fuzzy rule processor to perform fuzzy logic processing on a set of inputs based upon a first set of fuzzy rules and a first knowledge base, said fuzzy rule processor processes the first set of fuzzy rules sequentially, the first set of fuzzy rules includes an instruction that causes the fuzzy rule processor to jump to a fuzzy rule that is out of sequence conditioned upon at least one of a state of the set of inputs to the fuzzy rule processor, a state of a set of outputs of the fuzzy rule processor, and an output of a control processor;

a control processor coupled to the fuzzy rule processor and a first memory to load a second set of fuzzy rules and a second knowledge base into the first memory while the fuzzy rule processor processes the first set of fuzzy rules;

a first memory coupled to the fuzzy rule processor to store the first set of fuzzy rules and the first knowledge base, said first memory includes:
  an antecedent data memory having a first portion and a second portion, the first portion storing the first knowledge base, and the second portion storing the second knowledge base;
  a fuzzy rule memory having a first portion and a second portion, the first portion storing the first set of fuzzy rules, and the second portion storing the second set of fuzzy rules; and
  a control processor, instruction memory to store instructions executed by the control processor, said instructions executed by the control porcessor include an instruction to interrupt fuzzy logic processing by the fuzzy rule processor, cause the fuzzy rule processor to discontinue fuzzy logic processing based upon the first set of fuzzy rules and the first knowledge base and initiate fuzzy logic processing based upon the second set of fuzzy rules and the second knowledge base, and cause the fuzzy rule processor to process a predetermined number of fuzzy rules from the first set of fuzzy rules before returning control to the control processor;

an arithmetic-logic unit coupled to the control processor, the arithmetic-logic unit performing arithmetic processing and logic operations on inputs and outputs of the fuzzy rule processor;

a memory access controller coupled the control processor and the first memory, said memory access controller loads a first of the plurality of sets of fuzzy rules into the second portion of the fuzzy rule memory, and loads a first of the plurality of knowledge bases into the second portion of the antecedent data memory; and a second memory coupled to the memory access controller, the second memory storing a plurality of sets of fuzzy rules and a plurality of knowledge bases.

9. The fuzzy logic processor of claim 8, wherein the first memory includes:
  an antecedent data memory having a first portion and a second portion, the first portion storing the first knowledge base, and the second portion storing the second knowledge base;
  a fuzzy rule memory having a first portion and a second portion, the first portion storing the first set of fuzzy rules, and the second portion storing the second set of fuzzy rules; and
  a control processor instruction memory to store instructions executed by the control processor.

10. The fuzzy logic processor of claim 9, further comprising:
  an arithmetic-logic unit coupled to the control processor, the arithmetic-logic unit performing arithmetic processing and logic operations on inputs and outputs of the fuzzy rule processor;
  a memory access controller coupled the control processor and the first memory;
  a second memory coupled to the memory access controller, the second memory storing a plurality of sets of fuzzy rules and a plurality of knowledge bases; and
  wherein the memory access controller loads a first of the plurality of sets of fuzzy rules into the second portion of the fuzzy rule memory, and loads a first of the plurality of knowledge bases into the second portion of the antecedent data memory.

11. The fuzzy logic processor of claim 10, wherein the fuzzy rule processor processes the first set of fuzzy rules sequentially, and the first set of fuzzy rules includes an instruction that causes the fuzzy rule processor to jump to a fuzzy rule that is out of sequence.

12. The fuzzy logic processor of claim 9, wherein the instructions executed by the control processor include an instruction to interrupt fuzzy logic processing by the fuzzy rule processor.

13. The fuzzy logic processor of claim 9, wherein the instructions executed by the control processor include an instruction to cause the fuzzy rule processor to discontinue fuzzy logic processing based upon the first set of fuzzy rules and the first knowledge base and initiate fuzzy logic processing based upon the second set of fuzzy rules and the second knowledge base.

14. The fuzzy logic processor of claim 9, wherein the instructions executed by the control processor include an instruction to cause the fuzzy rule processor to process a predetermined number of fuzzy rules from the first set of fuzzy rules before returning control to the control processor.

15. The fuzzy logic processor of claim 8, wherein the instruction that causes the fuzzy rule processor to jump to a fuzzy rule that is out of sequence is conditioned upon at least one of:
  a state of the set of inputs to the fuzzy rule processor,
  a state of a set of outputs of the fuzzy rule processor, and
  an output of the control processor.

* * * * *

UNITED STATES PATENT AND TRADEMARK OFFICE
CERTIFICATE OF CORRECTION

PATENT NO.   : 6,385,598 B1
DATED        : May 7, 2002
INVENTOR(S)  : Biagi Giacalone, Francesco Pappalardo, Enrico Pelos and Vincenzo Catania It is certified that error appears in the above-identified patent and that said Letters Patent is hereby corrected as shown below:

<u>Title page,</u>
Item [73], should read as follows:
-- [73] Assignee: Consorzio per la Ricerca sulla Microelettronica nel Mezzogiorno Catania, IT --

Signed and Sealed this

Twenty-fifth Day of June, 2002

*Attest:*

JAMES E. ROGAN
*Attesting Officer*  *Director of the United States Patent and Trademark Office*